United States Patent
Yeh et al.

(10) Patent No.: US 12,280,453 B2
(45) Date of Patent: Apr. 22, 2025

(54) PROCESSING METHOD OF FORMIC ACID SOLDERING

(71) Applicant: 3S SILICON TECH, INC., Hsinchu County (TW)

(72) Inventors: Kuo-Liang Yeh, Hsinchu County (TW); Jung-Kuei Peng, Hsinchu County (TW); Ya Ju Chang, Hsinchu County (TW); Wen-Ting Huang, Hsinchu County (TW)

(73) Assignee: 3S Silicon Tech, Inc., Hsinchu County (TW)

( * ) Notice: Subject to any disclaimer, the term of this patent is extended or adjusted under 35 U.S.C. 154(b) by 501 days.

(21) Appl. No.: 17/891,268

(22) Filed: Aug. 19, 2022

(65) Prior Publication Data

US 2023/0182237 A1 Jun. 15, 2023

(30) Foreign Application Priority Data

Dec. 15, 2021 (TW) .................................. 110146903

(51) Int. Cl.
*B23K 1/00* (2006.01)
*B23K 1/015* (2006.01)
(Continued)

(52) U.S. Cl.
CPC .......... *B23K 35/3618* (2013.01); *B23K 1/015* (2013.01); *B23K 1/20* (2013.01);
(Continued)

(58) Field of Classification Search
CPC ............ B23K 35/3618; B23K 2103/08; B23K 2103/10; B23K 2103/12; B23K 2103/14;
(Continued)

(56) References Cited

U.S. PATENT DOCUMENTS 5,085,365 A * 2/1992 Turner ............... B23K 35/3612
148/23
5,281,281 A * 1/1994 Stefanowski ...... B23K 35/3612
148/23

(Continued)

FOREIGN PATENT DOCUMENTS

AT         392231 B  *  2/1991
CN     103681363 A  *  3/2014  ........... B23K 1/0016
(Continued)

*Primary Examiner* — Kiley S Stoner
(74) *Attorney, Agent, or Firm* — Joseph C. Zucchero; Carolyn S. Elmore; Elmore Patent Law Group, P.C.

(57) ABSTRACT

A processing method of formic acid soldering includes providing a solder, performing a formic acid providing step, performing a soldering step and performing a cooling step. The solder is disposed at a soldering object. In the formic acid providing step, a water-containing formic acid vapor extracted from a formic acid source is introduced to a soldering object so as to form a water-containing formic acid atmosphere surrounding the soldering object. In the soldering step, the solder and the soldering object are soldered in the water-containing formic acid atmosphere at a soldering temperature so as to form a soldered object with high temperature. In the cooling step, the soldered object with high temperature is cooled by a cooling method so as to form a soldered object. A range of a moisture content of the formic acid source is greater than or equal to 0.1 wt % and less than 15 wt %.

9 Claims, 9 Drawing Sheets

(51) Int. Cl.
    *B23K 1/20*     (2006.01)
    *B23K 35/36*     (2006.01)
    *B23K 103/08*     (2006.01)
    *B23K 103/10*     (2006.01)
    *B23K 103/12*     (2006.01)
    *B23K 103/14*     (2006.01)

(52) U.S. Cl.
    CPC ...... *B23K 2103/08* (2018.08); *B23K 2103/10* (2018.08); *B23K 2103/12* (2018.08); *B23K 2103/14* (2018.08)

(58) Field of Classification Search
    CPC ................. B23K 35/262; B23K 35/38; B23K 1/012–015; B23K 1/20; B23K 1/0016; B23K 2101/36–42
    USPC ..... 228/179.1–180.22, 218–220, 200, 234.2, 228/42, 46
    See application file for complete search history.

(56) References Cited

U.S. PATENT DOCUMENTS

| | | | |
|---|---|---|---|
| 6,344,407 B1 * | 2/2002 | Matsuki | B23K 35/38 |
| | | | 257/E23.021 |
| 2002/0130164 A1 * | 9/2002 | Matsuki | B23K 1/008 |
| | | | 228/43 |
| 2010/0170939 A1 * | 7/2010 | Ishikawa | H05K 3/341 |
| | | | 228/256 |
| 2011/0215483 A1 * | 9/2011 | Zhang | B23K 1/008 |
| | | | 257/E23.023 |
| 2013/0175323 A1 * | 7/2013 | Zhang | B23K 1/206 |
| | | | 228/4.1 |

FOREIGN PATENT DOCUMENTS

| | | | | |
|---|---|---|---|---|
| CN | 113634845 A | | 11/2021 | |
| CN | 116329810 A | * | 6/2023 | |
| EP | 458161 A | * | 11/1991 | ............... B23K 1/20 |
| EP | 0458161 A1 | * | 11/1991 | |
| EP | 0538821 A1 | | 4/1993 | |
| GB | 2466865 A | * | 7/2010 | ............. H05K 3/341 |
| JP | H0729215 B2 | * | 4/1995 | |
| JP | 2001244618 A | * | 9/2001 | ............. B23K 35/38 |
| JP | 2002361472 A | | 12/2002 | |
| JP | 5557951 B1 | * | 7/2014 | .......... B23K 1/0016 |
| JP | 2016196022 A | | 11/2016 | |
| JP | 7032686 B1 | * | 3/2022 | .......... B23K 35/025 |
| KR | 0177185 B1 | * | 2/1999 | |
| KR | 20010060262 A | * | 7/2001 | |
| KR | 20090033086 A | * | 4/2009 | |
| NL | 2026967 B1 | * | 7/2022 | |
| TW | 570856 B | | 1/2004 | |
| TW | 784839 B1 | * | 11/2022 | ......... B23K 35/3618 |
| TW | I784839 B | * | 11/2022 | |
| WO | WO-8600844 A | * | 2/1986 | ......... B23K 35/3612 |
| WO | WO-8600844 A1 | * | 2/1986 | |
| WO | WO-9103355 A1 | * | 3/1991 | |
| WO | WO-9417950 A1 | * | 8/1994 | ............... B23K 1/20 |

* cited by examiner

PROCESSING METHOD OF FORMIC ACID SOLDERING

RELATED APPLICATIONS

This application claims priority to Taiwan Application Serial Number 110146903, filed Dec. 15, 2021, which is herein incorporated by reference.

BACKGROUND

Technical Field

The present disclosure relates to processing method of formic acid soldering. More particularly, the present disclosure relates to a processing method of formic acid soldering applying water-containing formic acid as a source of formic acid vapor.

Description of Related Art

The soldering process has a long history. The conventional solder paste soldering process is also widely applied in related industries. The presence of a flux is necessary to the conventional solder paste soldering process, however, despite the conventional solder paste soldering process has been improved for several times, there are still some issues about the conventional solder paste soldering process, such as low reliability of solder joint, generating organic solvent waste during washing the component and leaving over organic acid metal salt.

In recent years, a processing method of formic acid soldering that replaces the flux with formic acid has been developed. The mechanism of the processing method of formic acid soldering is about providing formic acid vapor to react with the oxides on the surface of the soldering metal object and form formic acid metal salts, and further pyrolysis the formic acid metal salts in a high temperature so as to reduce the metals. Since there is no flux using in the processing method of formic acid soldering, the processing method of formic acid soldering has the advantages of soldered object with low void rate, no need to wash and improved reliability of solder joint.

However, pure formic acid, which is much more expensive than formic acid with lower purity, is usually applied as the source of formic acid vapor in the processing method of formic acid soldering in practical use, hence the cost of the processing method of formic acid soldering is enhanced.

Therefore, developing a processing method of formic acid soldering applying water-containing formic acid as a source of formic acid is a valuable goal in related industries.

SUMMARY

According to one aspect of the present disclosure, a processing method of formic acid soldering includes providing a solder, performing a formic acid providing step, performing a soldering step and performing a cooling step. The solder is disposed at a soldering object. In the formic acid providing step, a water-containing formic acid vapor extracted from a formic acid source is introduced to the soldering object so as to form a water-containing formic acid atmosphere surrounding the soldering object. In the soldering step, the solder and the soldering object are soldered in the water-containing formic acid atmosphere at a soldering temperature so as to form a soldered object with high temperature. In the cooling step, the soldered object with high temperature is cooled by a cooling method so as to form a soldered object. A range of moisture content of the formic acid source is greater than or equal to 0.1 wt % and less than 15 wt %.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
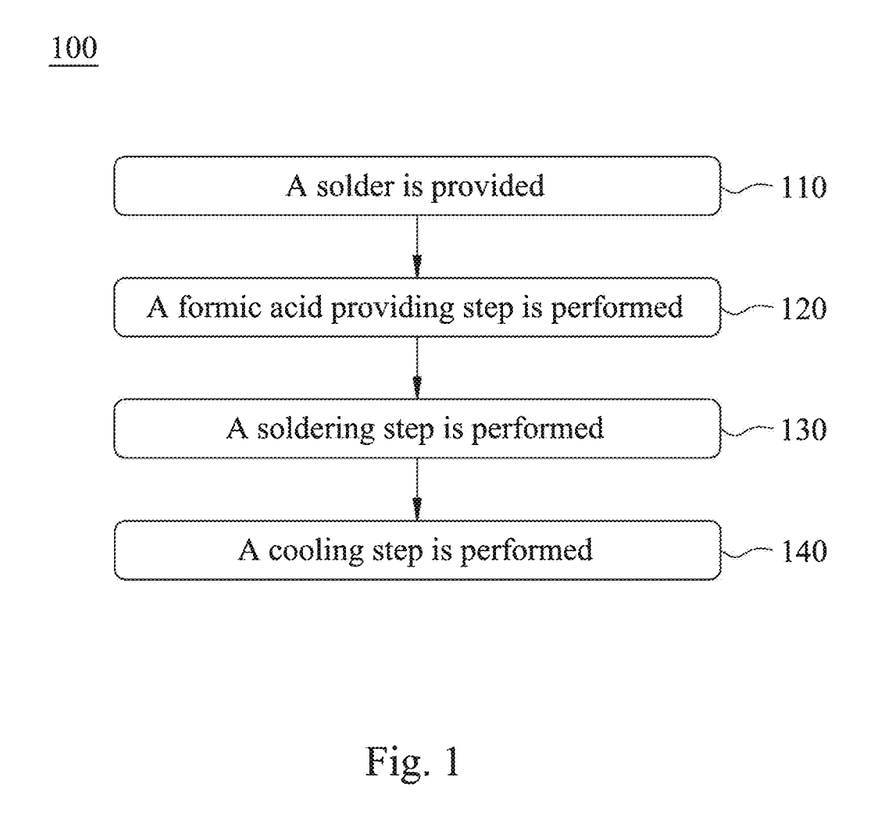
FIG. 1 is a flow diagram showing a processing method of formic acid soldering according to one aspect of the present disclosure.
Figure 2A:
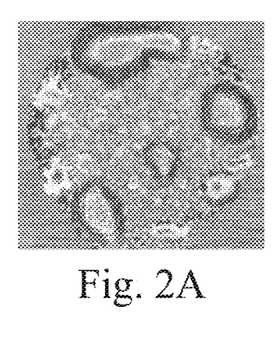
FIG. 2A, FIG. 2B, FIG. 2C and FIG. 2D are appearance pictures of high lead-containing solder paste after melting of example 1, example 2, example 3 and example 4 of the present disclosure, respectively.
Figure 2B:
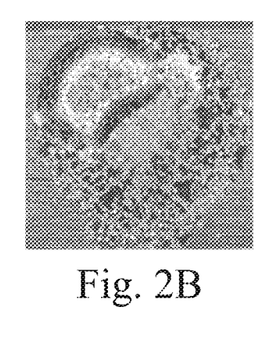
Figure 2C:
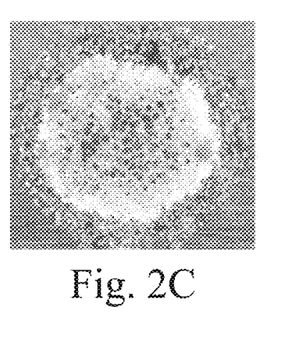
Figure 2D:
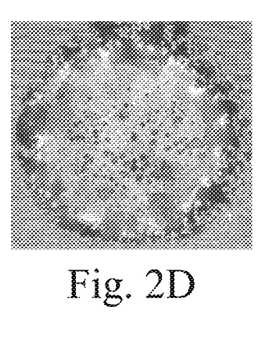
Figure 3A:
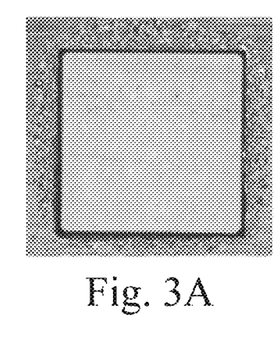
FIG. 3A, FIG. 3B, FIG. 3C and FIG. 3D are appearance pictures of a chip soldered on a substrate of example 1, example 2, example 3 and example 4 of the present disclosure, respectively.
Figure 3B:
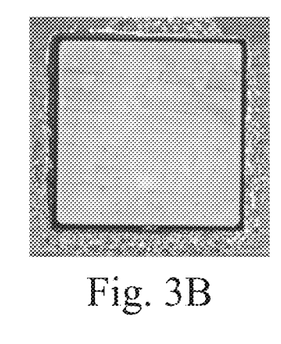
Figure 3C:
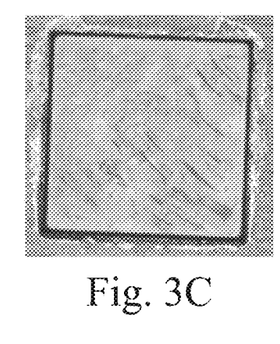
Figure 3D:
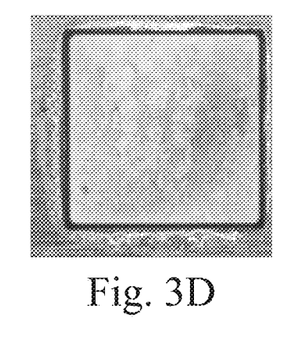
Figure 4A:
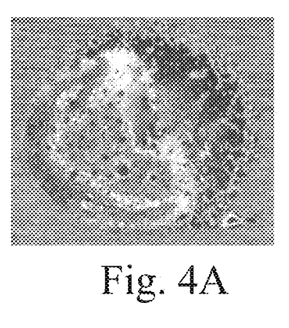
FIG. 4A, FIG. 4B, FIG. 4C and FIG. 4D are appearance pictures of high lead-containing solder paste after melting of example 5, example 6, example 7 and example 8 of the present disclosure, respectively.
Figure 4B:
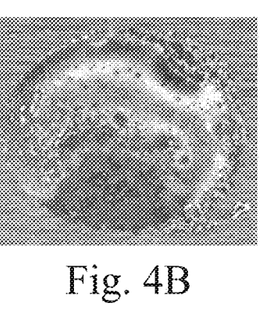
Figure 4C:
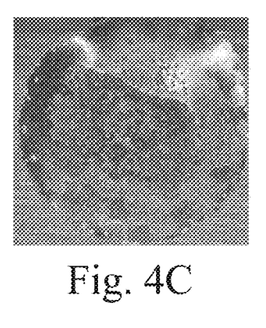
Figure 4D:
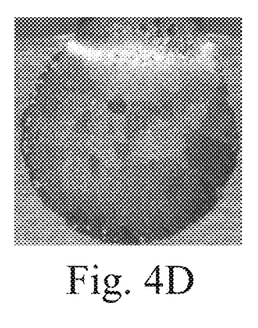
Figure 5A:
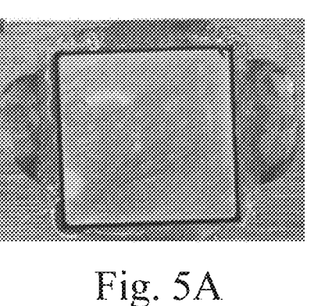
FIG. 5A, FIG. 5B, FIG. 5C and FIG. 5D are appearance pictures of a chip soldered on a substrate of example 5, example 6, example 7 and example 8 of the present disclosure, respectively.
Figure 5B:
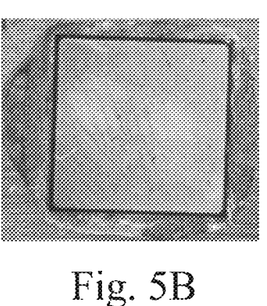
Figure 5C:
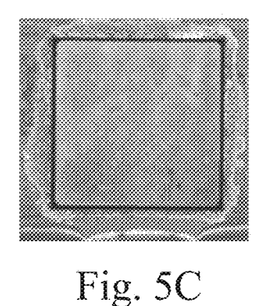
Figure 5D:
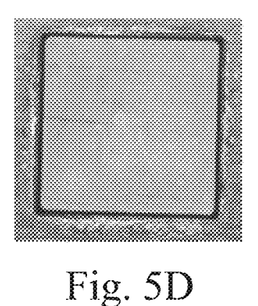
Figure 6A:
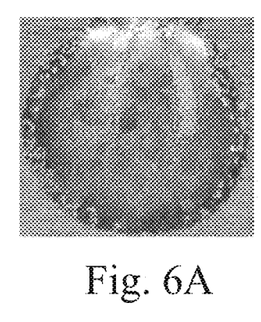
FIG. 6A, FIG. 6B, FIG. 6C and FIG. 6D are appearance pictures of high lead-containing solder paste after melting of example 9, example 10, example 11 and example 12 of the present disclosure, respectively.
Figure 6B:
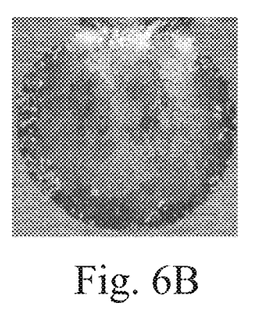
Figure 6C:
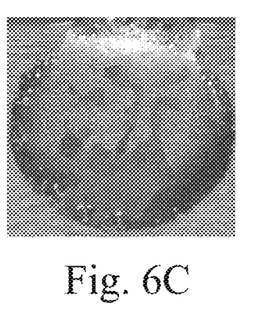
Figure 6D:
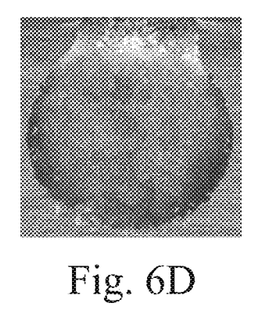
Figure 7A:
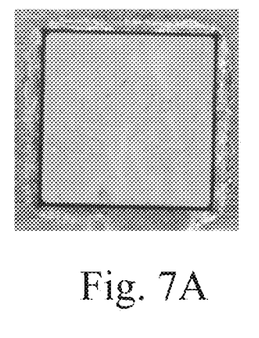
FIG. 7A, FIG. 7B, FIG. 7C and FIG. 7D are appearance pictures of a chip soldered on a substrate of example 9, example 10, example 11 and example 12 of the present disclosure, respectively.
Figure 7B:
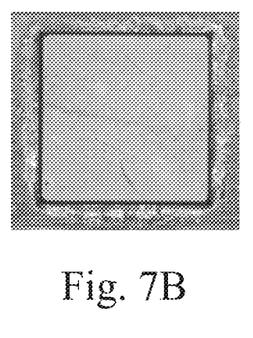
Figure 7C:
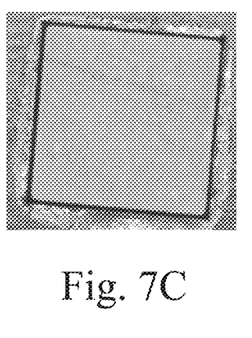
Figure 7D:
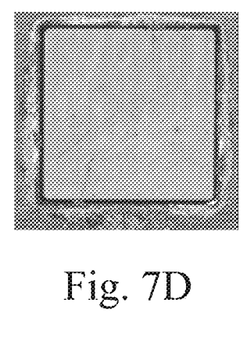
Figure 8A:
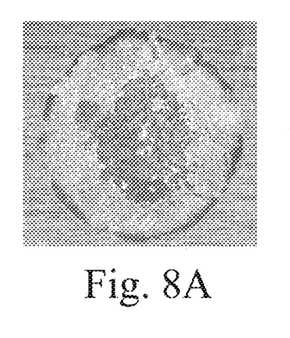
FIG. 8A, FIG. 8B, FIG. 8C and FIG. 8D are appearance pictures of high lead-containing solder paste after melting of example 13, example 14, example 15 and example 16 of the present disclosure, respectively.
Figure 8B:
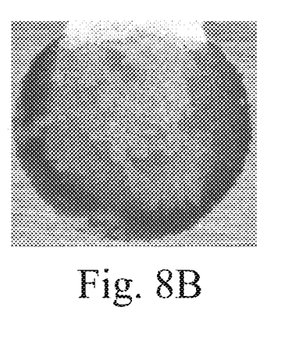
Figure 8C:
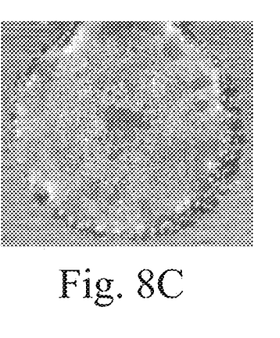
Figure 8D:
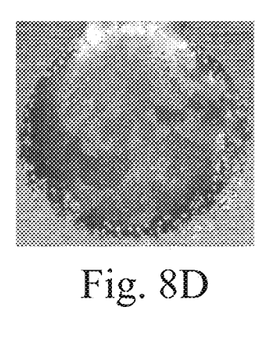
Figure 9A:
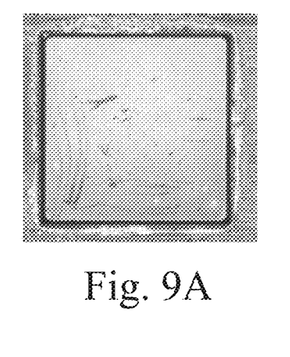
FIG. 9A, FIG. 9B, FIG. 9C and FIG. 9D are appearance pictures of a chip soldered on a substrate of example 13, example 14, example 15 and example 16 of the present disclosure, respectively.
Figure 9B:
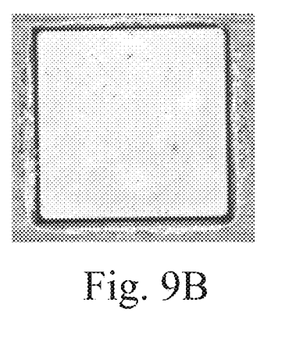
Figure 9C:
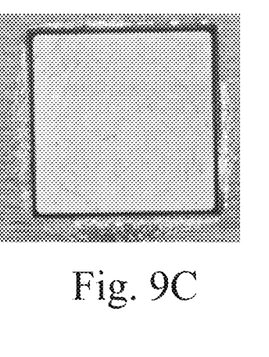
Figure 9D:
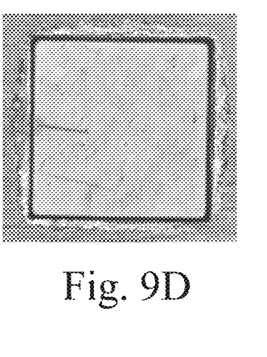
Figure 10A:
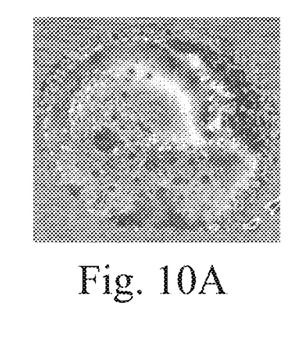
FIG. 10A, FIG. 10B, FIG. 10C and FIG. 10D are appearance pictures of high lead-containing solder paste after melting of example 17, example 18, example 19 and example 20 of the present disclosure, respectively.
Figure 10B:
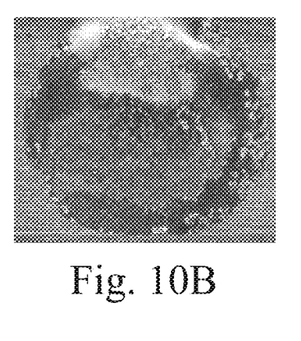
Figure 10C:
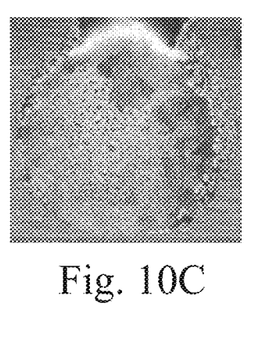
Figure 10D:
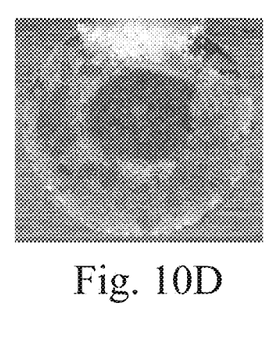
Figure 11A:
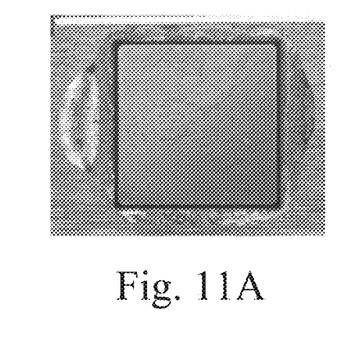
FIG. 11A, FIG. 11B, FIG. 11C and FIG. 11D are appearance pictures of a chip soldered on a substrate of example 17, example 18, example 19 and example 20 of the present disclosure, respectively.
Figure 11B:
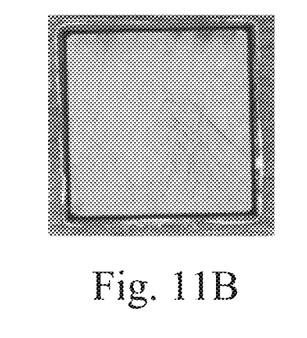
Figure 11C:
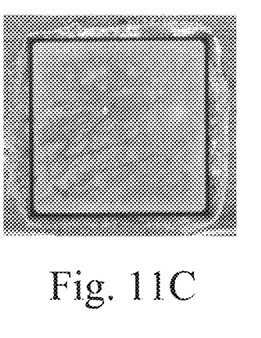
Figure 11D:
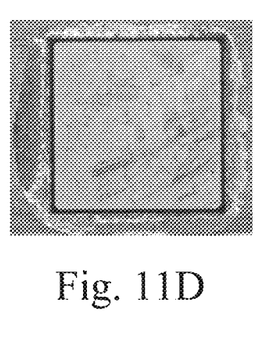
Figure 12A:
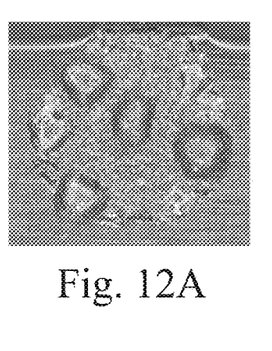
FIG. 12A, FIG. 12B, FIG. 12C and FIG. 12D are appearance pictures of high lead-containing solder paste after melting of example 21, example 22, example 23 and example 24 of the present disclosure, respectively.
Figure 12B:
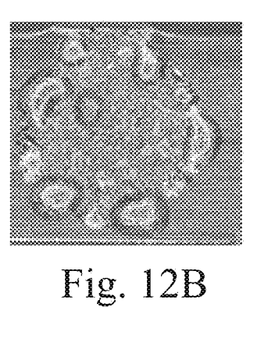
Figure 12C:
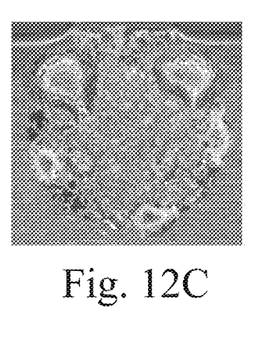
Figure 12D:
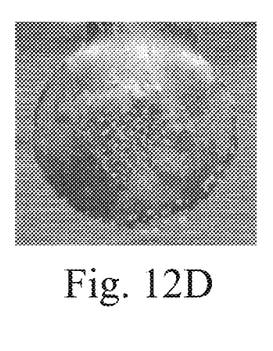
Figure 13A:
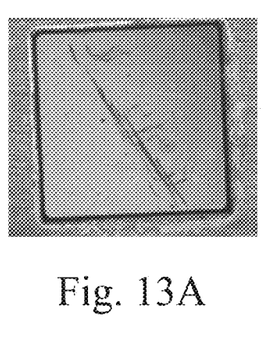
FIG. 13A, FIG. 13B, FIG. 13C and FIG. 13D are appearance pictures of a chip soldered on a substrate of example 21, example 22, example 23 and example 24 of the present disclosure, respectively.
Figure 13B:
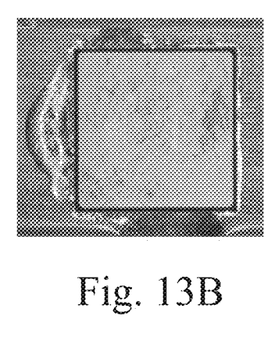
Figure 13C:
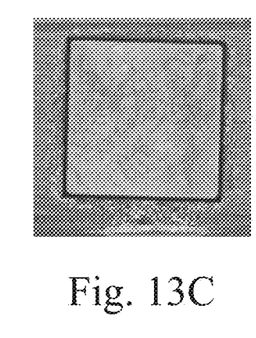
Figure 13D:
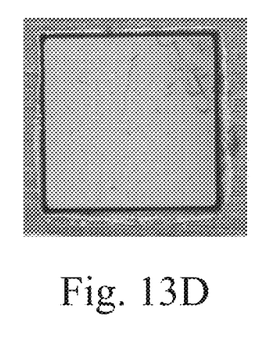
Figure 14A:
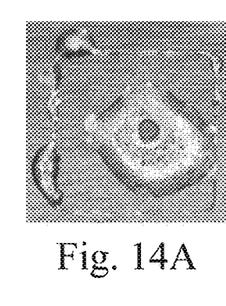
FIG. 14A, FIG. 14B, FIG. 14C, FIG. 14D, FIG. 14E and FIG. 14F are appearance pictures of tin solder preform after melting of example 25, example 26, example 27, example 28, example 29 and example 30 of the present disclosure, respectively.
Figure 14B:
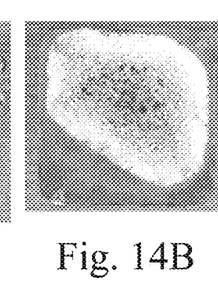
Figure 14C:
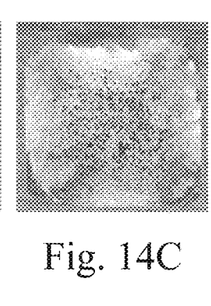
Figure 14D:
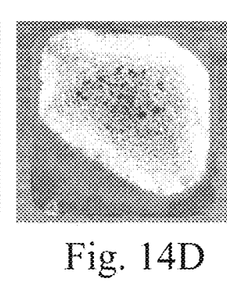
Figure 14E:
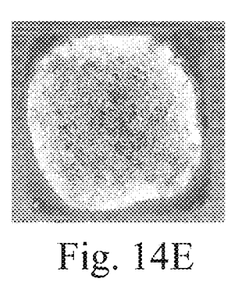
Figure 14F:
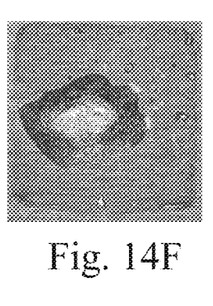
Figure 15A:
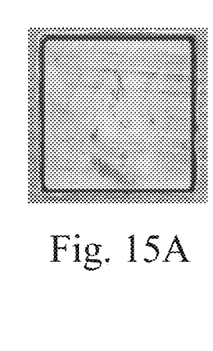
FIG. 15A, FIG. 15B, FIG. 15C, FIG. 15D, FIG. 15E and FIG. 15F are appearance pictures of a chip soldered on a substrate of example 25, example 26, example 27, example 28, example 29 and example 30 of the present disclosure, respectively.
Figure 15B:
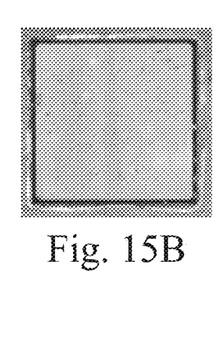
Figure 15C:
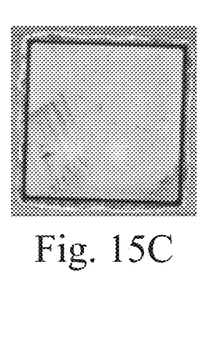
Figure 15D:
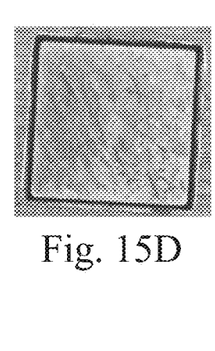
Figure 15E:
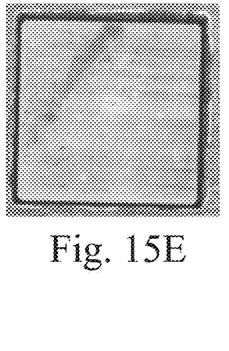
Figure 15F:
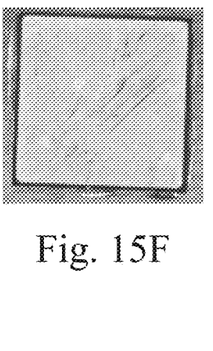
Figure 16A:
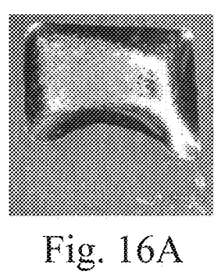
FIG. 16A, FIG. 16B, FIG. 16C, FIG. 16D, FIG. 16E and FIG. 16F are appearance pictures of lead-free solder paste after melting of example 31, example 32, example 33, example 34, example 35 and example 36 of the present disclosure, respectively.
Figure 16B:
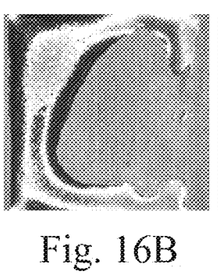
Figure 16C:
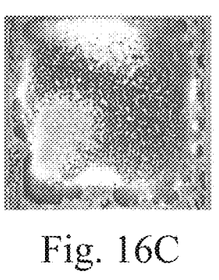
Figure 16D:
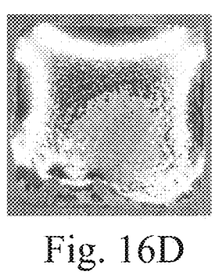
Figure 16E:
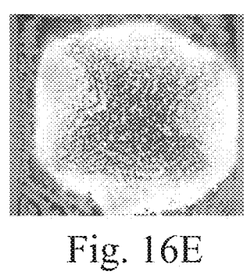
Figure 16F:
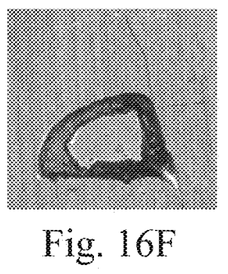
Figure 17A:
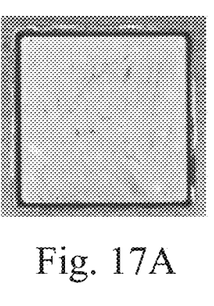
FIG. 17A, FIG. 17B, FIG. 17C, FIG. 17D, FIG. 17E and FIG. 17F are appearance pictures of a chip soldered on a substrate of example 31, example 32, example 33, example 34, example 35 and example 36 of the present disclosure, respectively.
Figure 17B:
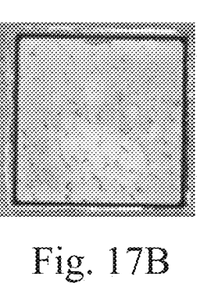
Figure 17C:
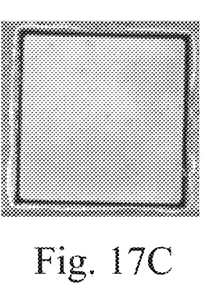
Figure 17D:
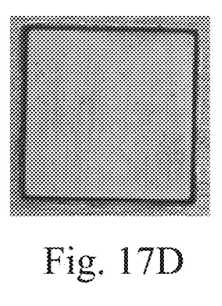
Figure 17E:
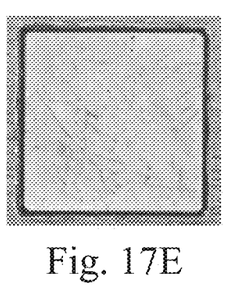
Figure 17F:
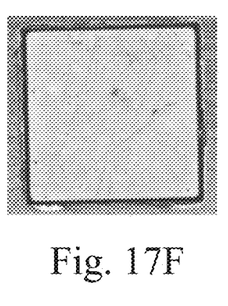

Please refer to FIG. 1. FIG. 1 is a flow diagram showing a processing method of formic acid soldering 100 according to one aspect of the present disclosure. The processing method of formic acid soldering 100 includes a step 110, a step 120, a step 130 and a step 140.

In step 110, a solder is provided, wherein the solder is disposed at a soldering object. In particular, a melting point of the solder applied in the processing method of formic acid soldering 100 of the present disclosure can be less than 400° C. The conventional solder such as lead-free alloy and lead-containing solder can be applied in the processing method of formic acid soldering 100 of the present disclosure. For example, Sn42/Bi58 (which melting point is 138° C.), Sn42/Bi57/Ag1 (which melting point is 138° C.), Sn64/Bi35/Ag1 (which melting point is 178° C.), Sn63/Pb37 (which melting point is 183° C.), Sn62/Pb36/Ag2 (which melting point is 183° C.), SAC305 (which melting point is 217° C.), SAC0307 (which melting point is 217° C. to 227° C.), SAC105 (which melting point is 217° C. to 227° C.), SAC0807 (which melting point is 217° C. to 227° C.), Sn5/Pb95 (which melting point is 280° C. to 312° C.), Sn5/Pb92.5/Ag2.5 (which melting point is 280° C. to 312° C.) and Sn10/Pb88/Ag2 (which melting point is 280° C. to 312° C.), but the present disclosure is not limited thereto.

Further, the form of the solder can be a solder preform or a solder paste, and a solvent, a thixotropic agent and an organic acid with low boiling point can also be added into the solder paste. The aforementioned organic components will be vaporized during the soldering process and will not remain in the soldered object. Therefore, the quality of the soldered object will not be damaged.

In detail, a material of a surface of the soldering object can be gold, silver, copper, nickel, tin, aluminum, titanium or an alloy thereof, but the present disclosure is not limited thereto.

In step 120, a formic acid providing step is performed. A water-containing formic acid vapor evaporated from a formic acid source is introduced to the soldering object so as to form a water-containing formic acid atmosphere surrounding the soldering object. In detail, a range of moisture content of the formic acid source is greater than or equal to 0.1 wt % and less than 15 wt %. Further, the range of moisture content of the formic acid source can be greater than or equal to 0.1 wt % and less than or equal to 10 wt %. Moreover, the range of moisture content of the formic acid source can be greater than or equal to 2 wt % and less than or equal to 10 wt %. The aforementioned ranges of moisture content of the formic acid source are calculated by weight percentage.

In detail, in the step 120, nitrogen can be applied as a carrier gas for carrying the water-containing formic acid vapor to the soldering object more effectively so as to form the water-containing formic acid atmosphere, and a partial vapor pressure of formic acid of the water-containing formic acid atmosphere is greater than or equal to 30 torr and less than or equal to 500 torr.

In the conventional processing methods of formic acid soldering, pure formic acid is applied as the formic acid source for soldering. However, a natural decomposition reaction of the pure formic acid is easy to occur after the pure formic acid being prepared, which decreases the concentration of the formic acid and results in the inconsistency of the concentration of the formic acid source in each soldering process. Therefore, the formic acid source applied in the conventional processing methods of formic acid soldering has to be change frequently to maintain the purity of the formic acid and further maintain the quality of soldering. Due to the reason above, using pure formic acid as the formic acid source not only increases the cost of the soldering process, but also increases more cost to treat the abandoned formic acid solution, which is also not an environment-friendly approach. The processing method of formic acid soldering 100 of the present disclosure using water-containing formic acid as the formic acid source for soldering, which decreases the costs of the soldering process and waste treatment. In addition, the soldering performance of the processing method of formic acid soldering 100 of the present disclosure by using water-containing formic acid with a specific range of moisture content as the formic acid source for soldering is better than the soldering performance of the conventional processing methods of formic acid soldering by using pure formic acid as the formic acid source. The related testing data and details will be further described in the follow-up examples and will not be describe herein.

In step 130, a soldering step is performed. The solder and the soldering object are soldered in the water-containing formic acid atmosphere at a soldering temperature so as to form a soldered object with high temperature. The temperature must be higher than the melting point of the solder applied during the heating process, and the aforementioned soldering temperature has a peak temperature, and a range of the peak temperature can be between 158° C. to 460° C. Further, the peak temperature depends on the applied solder, which can be greater than or equal to 20° C. to 60° C. of the melting point of the applied solder, but the present disclosure is not limited thereto.

In step 140, a cooling step is performed. The soldered object with high temperature is cooled by a cooling method so as to form a soldered object. The purpose of cooling is to prevent the soldered object with high temperature being further oxidized when it contacts to the air so as to decrease the quality of it. The aforementioned cooling method can be a cooling method which does not affect the soldering quality such as a gas-cooling method or a water-cooling method, but the present disclosure is not limited thereto.

In order to test the soldering performance of the processing method of formic acid soldering with different solders and confirm the range of moisture content of the formic acid source with the best soldering performance, the following examples are tested and compared to each other. The following tests are carried out in the same formic acid soldering furnace to prevent the experimental deviations caused by the differences of equipment.

In detail, the following examples are processed by the FA-100 formic acid soldering furnace developed by 3S Silicon Tech., Inc., and the formic acid is purchased from Sigma-Aldrich (100% purity), and the formic acid source with different concentrations in the following examples are obtained by diluting from the 100% purity formic acid by reverse osmosis water. In addition, before soldering, the nitrogen atmosphere is full of the reacting chamber of the formic acid soldering furnace, and the content of oxygen in the reacting chamber is less than 100 ppm, so as to prevent the outer gas affecting the soldering results. The soldering object applied in the following examples is a substrate made of copper, and the surface metallization of the substrate is Ti/Ni/Ag.

Moreover, the prepared formic acid source will be introduced into a heating tank and be heated and vaporized to form the water-containing formic acid vapor. A carrier gas, which is 99.999% of nitrogen, will carry the water-containing formic acid vapor to the soldering object so as to perform the following example tests.

The aforementioned process and settings is only for confirming the soldering performance of the processing method of formic acid soldering of the present disclosure instead of limiting the present disclosure. Other different types of formic acid soldering furnaces, soldering objects made of different materials, different purities or different elements of carrier gas can be applied in the present disclosure as long as the concentration of the formic acid source or the concentration of water-containing formic acid vapor are not affected. However, the present disclosure is not limited thereto.

Test 1. Using High Lead-Containing Solder Paste as a Solder for Soldering

In test 1, the high lead-containing solder paste which composition is Sn5/Pb92.5/Ag2.5 is applied as the solder to solder the substrate. In detail, the aforementioned high lead-containing solder paste is dispensed on eight position spots of the substrate so as to make each of the position spot has appropriate amount of the solder paste, and four of the eight position spots are covered by a chip to finish the preparation of the soldering substrate, respectively. The soldering substrate is subsequently disposed in the formic acid soldering furnace with 360° C. balanced peak temperature. Each of the appearance after soldering of the position spots is measured after the formic acid soldering process. Besides, the void rate of each position spot covered by the chip is also measured by X-ray additionally, and an average void rate is accordingly calculated by the measured void rates.

In detail, the average void rate is highly related to the reliability of a component. For instance, in the field of power devices, the average void rate should be less than 5% in general. In addition, the power device operated in high power condition has more strict restrictions about the average void rate, which average void rate should be less than 3% in general. Therefore, the soldering effect of the processing method of formic acid soldering can be determined by the average void rate of the soldered object.

Please refer to FIG. 2A, FIG. 2B, FIG. 2C, FIG. 2D, FIG. 3A, FIG. 3B, FIG. 3C, FIG. 3D and Table 1 below. FIG. 2A to FIG. 2D are appearance pictures of high lead-containing solder paste after melting of example 1, example 2, example 3 and example 4 of the present disclosure, respectively. FIG. 3A to FIG. 3D are appearance pictures of a chip soldered on a substrate of example 1, example 2, example 3 and example 4 of the present disclosure, respectively.

TABLE 1

| Concentration of formic acid source | ≥99.9 wt % | | | |
|---|---|---|---|---|
| Example | 1 | 2 | 3 | 4 |
| Formic acid supplying time (msec) | 500 | 1000 | 1500 | 2000 |
| Void rate of each position spot (%) | 24.65 | 13.99 | 2.03 | 1.64 |
| | 3.05 | 3.39 | 2.41 | 1.22 |
| | 2.33 | 2.24 | 1.78 | 2.3 |
| | 3.26 | 1.26 | 2.42 | 0.84 |
| Average void rate (%) | 8.32 | 5.22 | 2.16 | 1.50 |
| Tin melting performance | Normal | Normal | Better | Better |

According to Table 1, when the concentration of formic acid source is greater than or equal to 99.9 wt % (that is, the moisture content of the formic acid source is less than or equal to 0.1 wt %), the average void rate decreases as the formic acid supplying time becomes longer. However, the average void rate is less than 5% until the formic acid supplying time is 1500 msec. In addition, according to FIG. 2A to FIG. 2D, in example 1 and example 2, the appearances of melted tin after soldering show a lighter color, respectively, and the melted tin of both examples are slightly evenly distributed. Therefore the tin melting performance of example 1 and to example 2 are determined as "Normal". On the other hand, in example 3 and example 4, the appearances of melted tin after soldering show a bright color, respectively, and most of the melted tin of both examples are evenly distributed. Therefore the tin melting performance of example 3 and example 4 are determined as "Better". To sum up, considering the results of the average void rates and the appearances after soldering, a "Better" soldering quality can be obtained when the moisture content of the formic acid source is less than or equal to 0.1 wt % and the formic acid supplying time is over 1500 msec.

Please refer to FIG. 4A, FIG. 4B, FIG. 4C, FIG. 4D, FIG. 5A, FIG. 5B, FIG. 5C, FIG. 5D and Table 2 below. FIG. 4A to FIG. 4D are appearance pictures of high lead-containing solder paste after melting of example 5, example 6, example 7 and example 8 of the present disclosure, respectively. FIG. 5A to FIG. 5D are appearance pictures of a chip soldered on a substrate of example 5, example 6, example 7 and example 8 of the present disclosure, respectively.

TABLE 2

| Concentration of formic acid source | 98 wt % | | | |
|---|---|---|---|---|
| Example | 5 | 6 | 7 | 8 |
| Formic acid supplying time (msec) | 500 | 1000 | 1500 | 2000 |
| Void rate of each position spot (%) | 3.21 | 3.33 | 2.14 | 1.51 |
| | 2.87 | 2.66 | 2.03 | 1.67 |
| | 3.05 | 2.67 | 1.99 | 2.01 |
| | 4.26 | 2.51 | 2.46 | 1.82 |
| Average void rate (%) | 3.35 | 2.79 | 2.16 | 1.75 |
| Tin melting performance | Better | Better | Great | Great |

According to Table 2, when the concentration of formic acid source is 98 wt % (that is, the moisture content of the formic acid source is 2 wt %), the average void rate decreases as the formic acid supplying time becomes longer. Further, the average void rate is less than 5% when the formic acid supplying time is only 500 msec, and the average void rate is less than 3% when the formic acid supplying time is only 1000 msec. In addition, according to FIG. 4A to FIG. 4D, in example 5 and example 6, the appearances of melted tin after soldering show a bright color, respectively, and most of the melted tin are evenly distributed. Therefore the tin melting performance of example 5 and example 6 are determined as "Better". On the other hand, in example 7 and example 8, the appearances of melted tin after soldering show a bright color, respectively, and the melted tin are evenly distributed. Therefore the tin melting performance of example 7 and example 8 are determined as "Great". To sum up, considering the results of the average void rates and the appearances after soldering, a "Great" soldering quality can be obtained when the moisture content of the formic acid source is 2 wt % and the formic acid supplying time is over 1000 msec.

Please refer to FIG. 6A, FIG. 6B, FIG. 6C, FIG. 6D, FIG. 7A, FIG. 7B, FIG. 7C, FIG. 7D and Table 3 below. FIG. 6A to FIG. 6D are appearance pictures of high lead-containing solder paste after melting of example 9, example 10, example 11 and example 12 of the present disclosure, respectively. FIG. 7A to FIG. 7D are appearance pictures of a chip soldered on a substrate of example 9, example 10, example 11 and example 12 of the present disclosure, respectively.

TABLE 3

| Concentration of formic acid source | 96 wt % | | | |
|---|---|---|---|---|
| Example | 9 | 10 | 11 | 12 |
| Formic acid supplying time (msec) | 500 | 1000 | 1500 | 2000 |
| Void rate of each position spot (%) | 1.61 | 2.03 | 1.29 | 0.89 |
| | 1.43 | 1.43 | 1.63 | 1.25 |
| | 2.17 | 1.50 | 1.42 | 0.97 |
| | 1.87 | 1.76 | 1.33 | 1.04 |
| Average void rate (%) | 1.77 | 1.68 | 1.42 | 1.04 |
| Tin melting performance | Great | Great | Great | Great |

According to Table 3, when the concentration of formic acid source is 96 wt % (that is, the moisture content of the formic acid source is 4 wt %), the average void rate decreases as the formic acid supplying time becomes longer. Further, the average void rate is only 1.77% when the formic acid supplying time is only 500 msec. In addition, according to FIG. 6A to FIG. 6D, in example 9 to example 12, the appearances of melted tin after soldering show a bright color, respectively, and the melted tin are evenly distributed. Therefore the tin melting performance of example 9 to example 12 are determined as "Great". To sum up, considering the results of the average void rates and the appearances after soldering, a "Great" soldering quality can be obtained when the moisture content of the formic acid source is 4 wt % and the formic acid supplying time is over 500 msec.

Please refer to FIG. 8A, FIG. 8B, FIG. 8C, FIG. 8D, FIG. 9A, FIG. 9B, FIG. 9C, FIG. 9D and Table 4 below. FIG. 8A to FIG. 8D are appearance pictures of high lead-containing solder paste after melting of example 13, example 14, example 15 and example 16 of the present disclosure, respectively. FIG. 9A to FIG. 9D are appearance pictures of a chip soldered on a substrate of example 13, example 14, example 15 and example 16 of the present disclosure, respectively.

TABLE 4

| Concentration of formic acid source | 94 wt % | | | |
|---|---|---|---|---|
| Example | 13 | 14 | 15 | 16 |
| Formic acid supplying time (msec) | 500 | 1000 | 1500 | 2000 |
| Void rate of each position spot (%) | 0.31 | 1.05 | 1.2 | 0.65 |
| | 0.31 | 0.54 | 1.11 | 0.67 |
| | 0.11 | 0.58 | 1.01 | 0.97 |
| | 0.12 | 0.56 | 0.96 | 1.44 |
| Average void rate (%) | 0.21 | 0.68 | 1.07 | 0.93 |
| Tin melting performance | Great | Great | Great | Great |

According to Table 4, when the concentration of formic acid source is 94 wt % (that is, the moisture content of the formic acid source is 6 wt %), the average void rate is only 0.21% when the formic acid supplying time is only 500 msec. In addition, according to FIG. 8A to FIG. 8D, in example 13 to example 16, the appearances of melted tin after soldering show a bright color, respectively, and the melted tin are evenly distributed. Therefore the tin melting performance of example 13 to example 16 are determined as "Great". To sum up, considering the results of the average void rates and the appearances after soldering, a "Great" soldering quality can be obtained when the moisture content of the formic acid source is 6 wt % and the formic acid supplying time is over 500 msec.

Please refer to FIG. 10A, FIG. 10B, FIG. 10C, FIG. 10D, FIG. 11A, FIG. 11B, FIG. 11C, FIG. 11D and Table 5 below. FIG. 10A to FIG. 10D are appearance pictures of high lead-containing solder paste after melting of example 17, example 18, example 19 and example 20 of the present disclosure, respectively. FIG. 11A to FIG. 11D are appearance pictures of a chip soldered on a substrate of example 17, example 18, example 19 and example 20 of the present disclosure, respectively.

TABLE 5

| Concentration of formic acid source | 90 wt % | | | |
|---|---|---|---|---|
| Example | 17 | 18 | 19 | 20 |
| Formic acid supplying time (msec) | 500 | 1000 | 1500 | 2000 |
| Void rate of each position spot (%) | 2.56 | 1.93 | 1.21 | 0.45 |
| | 2.84 | 2.15 | 0.74 | 1.28 |
| | 2.58 | 1.82 | 0.81 | 1.45 |
| | 2.18 | 2.13 | 1.20 | 0.64 |
| Average void rate (%) | 2.54 | 2.01 | 0.99 | 0.96 |
| Tin melting performance | Better | Great | Great | Great |

According to Table 5, when the concentration of formic acid source is 90 wt % (that is, the moisture content of the formic acid source is 10 wt %), the average void rate is only 2.54% when the formic acid supplying time is only 500 msec. In addition, according to FIG. 10A to FIG. 10D, in example 17, the appearance of melted tin after soldering shows a bright color, and most of the melted tin is evenly distributed. Therefore the tin melting performance of example 17 is determined as "Better". On the other hand, in example 18 to example 20, the appearances of melted tin after soldering show a bright color, respectively, and the melted tin are evenly distributed. Therefore the tin melting performance of example 18 to example 20 are determined as "Great". To sum up, considering the results of the average void rates and the appearances after soldering, a "Great" soldering quality can be obtained when the moisture content of the formic acid source is 10 wt % and the formic acid supplying time is over 500 msec.

Please refer to FIG. 12A, FIG. 12B, FIG. 12C, FIG. 12D, FIG. 13A, FIG. 13B, FIG. 13C, FIG. 13D and Table 6 below. FIG. 12A to FIG. 12D are appearance pictures of high lead-containing solder paste after melting of example 21, example 22, example 23 and example 24 of the present disclosure, respectively. FIG. 13A to FIG. 13D are appearance pictures of a chip soldered on a substrate of example 21, example 22, example 23 and example 24 of the present disclosure, respectively.

TABLE 6

| Concentration of formic acid source | 85 wt % | | | |
|---|---|---|---|---|
| Example | 21 | 22 | 23 | 24 |
| Formic acid supplying time (msec) | 500 | 1000 | 1500 | 2000 |
| Void rate of each position spot (%) | 7.15 | 9.46 | 3.08 | 2.38 |
| | 7.35 | 23.94 | 3.17 | 1.32 |
| | 27.72 | 24.14 | 3.88 | 2.16 |
| | 6.44 | 24 | 14.73 | 1.26 |
| Average void rate (%) | 12.17 | 20.39 | 6.22 | 1.78 |
| Tin melting performance | Worse | Normal | Normal | Great |

According to Table 6, when the concentration of formic acid source is 85 wt % (that is, the moisture content of the formic acid source is 15 wt %), the average void rate decreases as the formic acid supplying time becomes longer. However, the average void rate is still quite high when the formic acid supplying time is less than 1000 msec. In addition, according to FIG. 12A to FIG. 12D, in example 21, the appearance of melted tin after soldering shows residual of the unmelted tin powder, and the color thereof is dark. Further, the melted tin is very unevenly distributed; therefore the tin melting performance of example 21 is determined as "Worse". On the other hand, in example 22 and example 23, the appearances of melted tin after soldering show a lighter color, respectively, and the melted tin are slightly evenly distributed. Therefore the tin melting performance of example 22 and example 23 are determined as "Normal". Moreover, in example 24, the appearance of melted tin after soldering shows a bright color, and the melted tin is evenly distributed. Therefore the tin melting performance of example 24 is determined as "Great". To sum up, considering the results of the average void rates and the appearances after soldering, a "Great" soldering quality can be obtained when the moisture content of the formic acid source is less than or equal to 15 wt % and the formic acid supplying time is over 2000 msec.

According to the results above, the processing method of formic acid soldering of the present disclosure can solder effectively when high lead-containing solder paste is applied as a solder, wherein the range of moisture content of the formic acid source is greater than or equal to 0.1 wt % and less than 15 wt %. The better range of moisture content of the formic acid source is greater than or equal to 0.1 wt % and less than or equal to 10 wt %. The best range of moisture content of the formic acid source is greater than or equal to 2 wt % and less than or equal to 10 wt %.

Test 2. Using Tin Solder Preform as a Solder for Soldering

In test 2, the tin solder preform which composition is Sn5/Pb92.5/Ag2.5 is applied as the solder to solder the substrate. In detail, the aforementioned tin solder preform is disposed on eight position spots of the substrate, and four of the eight position spots are covered by a chip to finish the preparation of the soldering substrate, respectively. The soldering substrate is subsequently disposed in the formic acid soldering furnace with 360° C. balanced peak temperature. Each of the appearance after soldering of the position spots is measured after the formic acid soldering process. Besides, the void rate of each position spot covered by a chip is also measured by X-ray additionally.

Please refer to FIG. 14A, FIG. 14B, FIG. 14C, FIG. 14D, FIG. 14E, FIG. 14F, FIG. 15A, FIG. 15B, FIG. 15C, FIG. 15D, FIG. 15E, FIG. 15F and Table 7 below. FIG. 14A to FIG. 14F are appearance pictures of tin solder preform after melting of example 25, example 26, example 27, example 28, example 29 and example 30 of the present disclosure, respectively. FIG. 15A to FIG. 15F are appearance pictures of a chip soldered on a substrate of example 25, example 26, example 27, example 28, example 29 and example 30 of the present disclosure, respectively.

TABLE 7

| Formic acid supplying time | 500 msec | | | | | |
|---|---|---|---|---|---|---|
| Example | 25 | 26 | 27 | 28 | 29 | 30 |
| Concentration of formic acid source (wt %) | 99.9 | 98 | 96 | 94 | 90 | 85 |
| Void rate of spot (%) each position | 1.67 | 2.01 | 0.89 | 0.9 | 0.39 | 3.37 |
| | 2.21 | 1.56 | 1.04 | 0.94 | 0.13 | 3.20 |
| | 2.16 | 1.02 | 1.19 | 1.06 | 0.23 | 2.79 |
| | 1.60 | 1.95 | 0.76 | 1.21 | 1.35 | 15.44 |
| Average void rate (%) | 1.91 | 1.64 | 0.97 | 1.03 | 0.53 | 6.2 |
| Tin melting performance | Normal | Normal | Great | Great | Great | Worst |

According to Table 7, under the same condition of formic acid supplying time (500 mesc), when the concentration of formic acid source is greater than or equal to 90 wt % (that is, the moisture content of the formic acid source is greater than or equal to 0.1 wt % and less than or equal to 10 wt %), the average void rates are all less than 3%. However, it has a higher average void rate when the concentration of formic acid source is 85 wt % (that is, the moisture content of the formic acid source is 15 wt %). In addition, according to FIG. 14A to FIG. 14F, in example 25 and example 26, the appearances of melted tin are shrunk, and the tin solder preform are not completely bonded with the substrate. Therefore the tin melting performance of example 25 and example 26 are determined as "Normal". On the other hand, in example 27, example 28 and example 29, the appearances of melted tin are good, and the tin solder preform are completely bonded with the substrate and only show little shrunk. Therefore the tin melting performance of example 27, example 28 and example 29 are determined as "Great". Moreover, in example 30, the appearance of melted tin is severely shrunk, and the bonding area between the tin solder preform and the substrate is very small. Therefore the tin melting performance of example 30 is determined as "Worst". To sum up, considering the results of the average void rates and the appearances after soldering, a "Great" soldering quality can be obtained when the formic acid supplying time is 500 msec, and the moisture content of the formic acid source is greater than or equal to 0.1 wt % and less than 10 wt %.

According to the results above, the processing method of formic acid soldering of the present disclosure can solder effectively when tin solder preform is applied as a solder, wherein the best range of moisture content of the formic acid source is greater than or equal to 0.1 wt % and less than 10 wt %.

Test 3. Using Lead-Free Solder Paste as a Solder for Soldering

In test 3, the lead-free solder paste which composition is Sn96.5/Cu0.5/Ag3 is applied as the solder to solder the substrate. In detail, the aforementioned lead-free solder paste is dispensed on eight position spots of the substrate so as to make each of the position spot has appropriate amount of the solder paste, and four of the eight position spots are covered by a chip to finish the preparation of the soldering substrate, respectively. The soldering substrate is subsequently disposed in the formic acid soldering furnace with 360° C. balanced peak temperature. Each of the appearance after soldering of the position spots is measured after the formic acid soldering process. Besides, the void rate of each position spot covered by a chip is also measured by X-ray additionally.

Please refer to FIG. 16A, FIG. 16B, FIG. 16C, FIG. 16D, FIG. 16E, FIG. 16F, FIG. 17A, FIG. 17B, FIG. 17C, FIG. 17D, FIG. 17E, FIG. 17F and Table 8 below. FIG. 16A to FIG. 16F are appearance pictures of lead-free solder paste after melting of example 31, example 32, example 33, example 34, example 35 and example 36 of the present disclosure, respectively. FIG. 17A to FIG. 17F are appearance pictures of a chip soldered on a substrate of example 31, example 32, example 33, example 34, example 35 and example 36 of the present disclosure, respectively.

TABLE 8

| Formic acid supplying time | 500 msec | | | | | |
|---|---|---|---|---|---|---|
| Example | 31 | 32 | 33 | 34 | 35 | 36 |
| Concentration of formic acid source (wt %) | 99.9 | 98 | 96 | 94 | 90 | 85 |
| Void rate of each position spot (%) | 4.80 | 2.64 | 1.22 | 0.59 | 0.81 | 7.18 |
| | 4.50 | 2.33 | 1.45 | 0.32 | 0.53 | 8.44 |
| | 4.73 | 3.01 | 0.88 | 1.09 | 0.44 | 7.10 |
| | 3.58 | 2.87 | 1.38 | 0.84 | 1.32 | 5.94 |
| Average void rate (%) | 4.40 | 2.71 | 1.23 | 0.71 | 0.78 | 7.17 |
| Tin melting performance | Normal | Normal | Great | Great | Great | Worst |

According to Table 8, under the same condition of formic acid supplying time (500 mesc), when the concentration of formic acid source is greater than or equal to 90 wt % and less than or equal to 99.9 wt % (that is, the moisture content of the formic acid source is greater than or equal to 0.1 wt % and less than or equal to 10 wt %), the average void rates are all less than 5%. When the concentration of formic acid source is greater than or equal to 90 wt % and less than or equal to 98 wt % (that is, the moisture content of the formic acid source is greater than or equal to 2 wt % and less than or equal to 10 wt %), the average void rates are all less than 3%. However, it has a higher average void rate when the concentration of formic acid source is 85 wt % (that is, the moisture content of the formic acid source is 15 wt %) or 99.9 wt % (that is, the moisture content of the formic acid source is 0.1 wt %). In addition, according to FIG. 16A to FIG. 16F, in example 31 and example 32, the appearances of melted tin are shrunk, and the lead-free solder paste are not completely bonded with the substrate. Therefore the tin melting performance of example 31 and example 32 are determined as "Normal". On the other hand, in example 33, example 34 and example 35, the appearances of melted tin are good, and the lead-free solder paste are completely bonded with the substrate and only show little shrunk. Therefore the tin melting performance of example 33, example 34 and example 35 are determined as "Great". Moreover, in example 36, the appearance of melted tin is severely shrunk, and the bonding area between the lead-free solder paste and the substrate is very small. Therefore the tin melting performance of example 36 is determined as "Worst". To sum up, considering the results of the average void rates and the appearances after soldering, a "Great" soldering quality can be obtained when the formic acid supplying time is 500 msec, and the moisture content of the formic acid source is greater than or equal to 2 wt % and less than 10 wt %.

According to the results above, the processing method of formic acid soldering of the present disclosure can solder effectively when lead-free solder paste is applied as a solder, wherein the best range of moisture content of the formic acid source is greater than or equal to 2 wt % and less than 10 wt %.

In summary, the processing method of formic acid soldering of the present disclosure can perform the soldering process effectively, and by using the formic acid source which has the range of moisture content being greater than or equal to 0.1 wt % and less than 15 wt % so as to reach the goals of decreasing the costs of formic acid soldering process and waste treatment, environment friendly and obtaining a much better soldering performance.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A processing method of formic acid soldering, comprising:
   providing a solder, wherein the solder is disposed at a soldering object;
   performing a formic acid providing step, wherein a water-containing formic acid vapor extracted from a formic acid source is introduced to the soldering object so as to form a water-containing formic acid atmosphere surrounding the soldering object;
   performing a soldering step, wherein the solder and the soldering object are soldered in the water-containing formic acid atmosphere at a soldering temperature so as to form a soldered object with high temperature;
   performing a cooling step, wherein the soldered object with high temperature is cooled by a cooling method so as to form a soldered object;
   wherein a range of moisture content of the formic acid source is greater than or equal to 0.1 wt % and less than 15 wt %.

2. The processing method of formic acid soldering of claim 1, wherein a material of a surface of the soldering object is gold, silver, copper, nickel, tin, aluminum, titanium or an alloy thereof.

3. The processing method of formic acid soldering of claim 1, wherein a melting point of the solder is less than 400° C.

4. The processing method of formic acid soldering of claim 1, wherein the range of moisture content of the formic acid source is greater than or equal to 0.1 wt % and less than or equal to 10 wt %.

5. The processing method of formic acid soldering of claim 4, wherein the range of moisture content of the formic acid source is greater than or equal to 2 wt % and less than or equal to 10 wt %.

6. The processing method of formic acid soldering of claim 1, further comprising a carrier gas for carrying the water-containing formic acid vapor to the soldering object.

7. The processing method of formic acid soldering claim 1, wherein a partial vapor pressure of formic acid of the water-containing formic acid atmosphere is greater than or equal to 30 torr and less than or equal to 500 torr.

8. The processing method of formic acid soldering claim 1, wherein the soldering temperature has a peak temperature, and a range of the peak temperature is between 158° C. to 460° C.

9. The processing method of formic acid soldering of claim 1, wherein the cooling method is a gas-cooling method or a water-cooling method.

\* \* \* \* \*